United States Patent [19]
Alten

[11] Patent Number: 4,825,606
[45] Date of Patent: May 2, 1989

[54] DEFORMABLE SEALING ARRANGEMENT FOR THE GAP BETWEEN THE EDGE OF AN OPENING IN A BUILDING AND THE BACK END OF A VEHICLE THAT IS DRIVEN UP TO THE OPENING

[76] Inventor: Kurt Alten, Ringstr. 14, D-3015, Wennigsen, Fed. Rep. of Germany

[21] Appl. No.: 90,169

[22] Filed: Aug. 27, 1987

[30] Foreign Application Priority Data

Aug. 30, 1986 [DE] Fed. Rep. of Germany ....... 3629643

[51] Int. Cl.$^4$ .............................................. E04B 7/16
[52] U.S. Cl. ................................................ 52/173 DS
[58] Field of Search ..................... 52/173 DS; 14/71.5

[56] References Cited

U.S. PATENT DOCUMENTS

| | | | |
|---|---|---|---|
| 3,322,132 | 5/1967 | Reider et al. | 52/173 DS X |
| 3,461,627 | 8/1969 | Conger | 52/173 DS |
| 3,653,173 | 4/1972 | Frommelt et al. | 52/173 DS |
| 3,772,839 | 11/1973 | Timbers | 52/173 DS |
| 4,495,737 | 1/1985 | Alten | 52/173 DS |
| 4,516,366 | 5/1985 | Alten | 52/173 DS |

FOREIGN PATENT DOCUMENTS 2428989  1/1976  Fed. Rep. of Germany ... 52/173 DS

Primary Examiner—David A. Scherbel
Assistant Examiner—Richard E. Chilcot, Jr.
Attorney, Agent, or Firm—Becker & Becker, Inc.

[57] ABSTRACT

A deformable sealing arrangement for the gap between the edge of an opening in a building and the back end of a vehicle that is driven up to the opening. An apron is provided, with the side portions thereof being secured to the side legs of the U-shaped frame, and with the upper, transversely extending portion of the apron being secured to the horizontal leg of the frame. A horizontal tensioning member is provided below the horizontal, top leg of the frame, with the ends of this tensioning member being secured to the upper ends of the side legs of the frame. By tightening the tensioning member, the top leg can buckle upwardly. This counteracts the formation of creases in the apron and also counteracts a lateral displacement of the side legs.

4 Claims, 1 Drawing Sheet

U.S. Patent
May 2, 1989
4,825,606
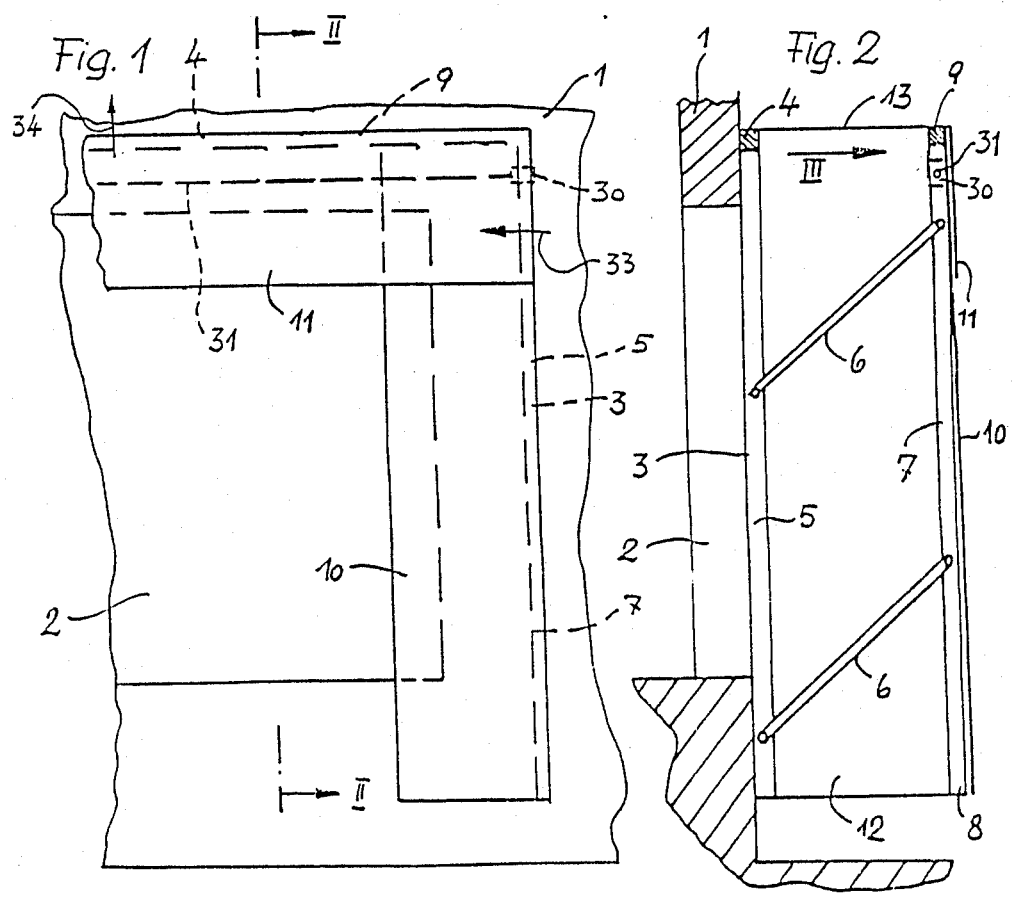
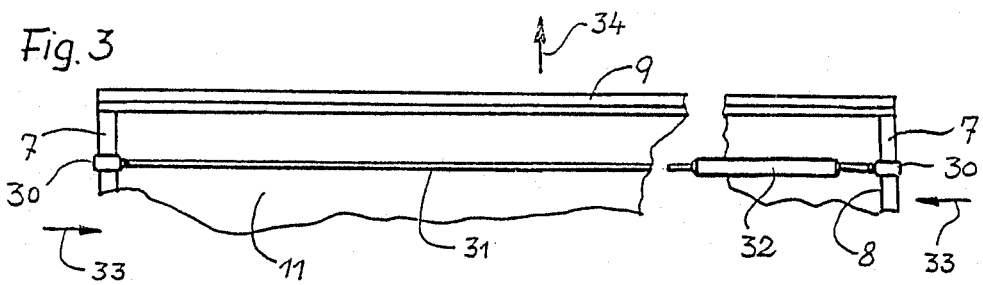

DEFORMABLE SEALING ARRANGEMENT FOR THE GAP BETWEEN THE EDGE OF AN OPENING IN A BUILDING AND THE BACK END OF A VEHICLE THAT IS DRIVEN UP TO THE OPENING

BACKGROUND OF THE INVENTION

The present invention relates to a deformable sealing arrangement for the gap between the edge of an opening in a building and the back end of a vehicle that is driven up to the opening. An apron is secured to the sides and top of a U-shaped frame that is open at the bottom and is disposed at a distance from the building. The two side legs of the frame serve to hold the side portions of the apron, and the horizontal, top leg of the frame serve to hold the upper, transversely extending portion of the apron.

The present invention proceeds from the observation that with heretofore known that sealing arrangements of the aforementioned general type, the formation of creases or bends in the upper portion of the apron cannot be avoided. This formation of creases can be caused by deformation of the leg, and also by undesired deformations of one of the apron sections. These creases adversely affect not only the sealing effect, but worse yet, signs or legends that are disposed on these apron sections can become distorted and made unreadable.

It is therefore an object of the present invention to improve a sealing arrangement of the aforementioned general type in such a way that the formation of creases or similar undesirable deformations in the transversely extending apron section can be avoided entirely or at least to a large extent.

BRIEF DESCRIPTION OF THE DRAWING

This object, and other objects and advantages of the present invention, will appear more clearly from the following specification in conjunction with the accompanying schematic drawing, in which:

FIG. 1 is a partial view of one exemplary embodiment of the inventive sealing arrangement at the edge of an opening in a building;

FIG. 2 is a cross-sectional view taken along the line II—II in FIG. 1; and

FIG. 3 is a partial view of the sealing arrangement of FIG. 2 taken in the direction of the arrow III thereof.

SUMMARY OF THE INVENTION

The sealing arrangement of the present invention is characterized primarily by an adjustable tensioning member, the ends of which are connected to the side legs of the frame. The tensioning member is advantageously disposed parallel to the horizontal, top leg of the frame, and is expediently secured to the side legs in such a way that the ends of the tensioning member are connected to the upper ends of the side legs at a distance of several centimeters, for example 5 to 8 cm, below the horizontal, top leg.

Since the ends of the tensioning member are connected to the side legs of the frame, and these side legs are rigidly connected to the top leg, a contracting of the two side legs effects a moment that leads to an upward buckling of the top leg without requiring additional pressure rods. At the same time, however, the two side legs are also pulled to the middle of the sealing arrangement, i.e. to the middle of the opening of the housing, with these side legs being prevented from being displaced outwardly to the side, which could occur due to the loading and deformation of the side portions of the apron. Thus, the tensioning member serves a double function. In the absence of pressure rods, a buckling can be achieved, while in addition the side legs are prevented from carrying out an undesired deflection toward the side.

Further specific features of the present invention will be described in detail subsequently.

DESCRIPTION OF PREFERRED EMBODIMENTS

Referring now to the drawing in detail, the building 1 has an opening 2 up to which the back end of a vehicle can be driven for loading and unloading thereof. A U-shaped frame 3 extends around this opening 2. The frame 3 is securely connected to the building 1, and has a horizontal leg 4 that is disposed above the opening 2 as well as legs 5 that are disposed on both sides of the opening 2. Hinged to the legs 5 are links 6, the free ends of which are connected to the vertical legs 7 of a similarly U-shaped frame 8, which has a horizontal leg 9; the legs 7 can be made of channel iron. The sizes of the frames 3 and 8 are the same. The frame 8 can be moved in the direction toward the building 1 via the links 6, which can be embodied in such a way that their lengths can be altered.

A flexible, durable apron, which can conform to the shape of the vehicle, and which is in the form of a foil or thin sheet, is provided on the leg 9 and on the two legs 7. This apron comprises two vertical strips 10, and an upper, horizontal strip 11. The strips 10 are secured to the ends of the leg 9 and to the legs 7, while the upper edge of the strip 11 is connected to the leg 9, but otherwise hangs freely.

The two frames 3, 8 are connected by a cover, for example a fabric. The side portions of the cover are designated by the reference numeral 12, while the upper portion 13, which acts as a roof, interconnects the legs 4 and 9.

At the upper ends of the legs 7, in a location approximately 5 to 8 cm below the leg 9, the legs 7 are surrounded by a collar or bracket 30 that serves for the securing of a pull-resistant cable or line 31. The cable 31 extends parallel to the leg 9 and is provided with a tensioning mechanism 32 in order to be able to set or adjust the tension of the cable. Since the ends of the leg 9 are rigidly connected to the upper ends of the legs 7, a moment is introduced into the leg 9 when the cable 31 is tensioned. This leads to an upward buckling of the leg 9 in the direction of the arrow 34, while at the same time, due to the tensioning of the cable, forces are introduced into the legs 7 in the direction of the arrows 33 that prevent the legs 7 from deflecting to the side.

This arrangement for the buckling of the leg 9 is very easy to construct, especially since no pressure rods are provided that act upon the leg 9 from the cable 31.

The present invention is, of course, in no way restricted to the specific disclosure of the specification and drawing, but also encompasses any modifications within the scope of the appended claims.

What I claim is:

1. A deformable sealing arrangement for a gap between an edge of an opening in a building and a back end of a vehicle that is driven up to the opening; an apron is secured to a pair of vertical sides having upper portions and a horizontal top of a U-shaped frame that is open at a bottom thereof and is disposed in a spaced relation away from a side of said building, with the pair of vertical sides of said frame serving to hold said apron along the pair of vertical sides of said frame, and the horizontal top of said frame serving to hold an upper, transversely extending portion of said apron; said sealing arrangement in combination further comprising:

an adjustable tensioning member having two ends, each of which is connected to a respective one of said pair of vertical sides of said frame, said tensioning member serving a double function since said ends thereof are connected to said pair of vertical sides of said frame and these vertical sides are rigidly connected to the horizontal top and a the vertical sides to effect a moment for an upward buckling of the horizontal top under a prestressed condition, and at the same time, however, the vertical sides are also pulled to a middle of the sealing arrangement, due to loading and deformation of the vertical sides of the apron; and means for adjusting the tension of said tensioning member, said ends of said tensioning member being connected to said pair of vertical sides of said frame near said horizontal top of said frame so that said means for adjusting the tension of said tensioning member is effective even during non-use thereof to avoid formulation of creases and undesirable fold deformations in the upper transversely extending portion of said apron.

2. A sealing arrangement in combination according to claim 1, in which said tensioning member is disposed parallel to said top of said frame.

3. A sealing arrangement in combination according to claim 2, in which said tensioning member is a cable.

4. A sealing arrangement in combination according to claim 1, in which said ends of asid tensioning member are connected to upper portions of said vertical sides approximately 5 to 8 cm below said frame top.

* * * * *